(12) United States Patent
Im et al.

(10) Patent No.: US 12,235,724 B2
(45) Date of Patent: Feb. 25, 2025

(54) METHOD AND APPARATUS FOR PROCESSING TRANSACTION

(71) Applicant: SAMSUNG SDS CO., LTD., Seoul (KR)

(72) Inventors: Jong In Im, Seoul (KR); Sang Uk Han, Seoul (KR); Joo Kyung Park, Seoul (KR); Yong Tae Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 146 days.

(21) Appl. No.: 17/826,645

(22) Filed: May 27, 2022

(65) Prior Publication Data

US 2022/0382635 A1 Dec. 1, 2022

(30) Foreign Application Priority Data

May 28, 2021 (KR) .................. 10-2021-0069115

(51) Int. Cl.
 *G06F 11/14* (2006.01)
 *G06F 16/23* (2019.01)
 *G06F 16/25* (2019.01)

(52) U.S. Cl.
 CPC ...... *G06F 11/1402* (2013.01); *G06F 16/2365* (2019.01); *G06F 16/252* (2019.01)

(58) Field of Classification Search
 None
 See application file for complete search history.

(56) References Cited

U.S. PATENT DOCUMENTS 9,514,006 B1 12/2016 Busaba et al.
2008/0243865 A1* 10/2008 Hu .................. G06F 16/27

(Continued)

FOREIGN PATENT DOCUMENTS

CN 111143041 A 5/2020
CN 112527599 A 3/2021

(Continued)

OTHER PUBLICATIONS

Rick Greenwald et al., "Oracle Essentials: Oracle Database 12c", 5th edition, Sep. 21, 2013, 396 pages, O'Reilly Media, ISBN: 978-1-4493-4303-3, XP055678456.

(Continued)

*Primary Examiner* — Irene Baker
(74) *Attorney, Agent, or Firm* — Sughrue Mion, PLLC

(57) ABSTRACT

A method for processing a series of database transactions according to an embodiment includes recording a first transaction requested to a first database by a first application, among the plurality of applications, in association with a transaction group ID, recording a second transaction requested to a second database by a second application called by the first application, among the plurality of applications, in association with the transaction group ID, rolling back the second transaction targeted to the second database in response to a determination that an error has occurred during processing of the second transaction, identifying the first transaction based on the transaction group ID and rolling back the first transaction targeted to the first database.

17 Claims, 10 Drawing Sheets

(56) References Cited

U.S. PATENT DOCUMENTS

| | | | |
|---|---|---|---|
| 2009/0217274 A1* | 8/2009 | Corbin | G06F 9/466 |
| | | | 718/101 |
| 2010/0169284 A1* | 7/2010 | Walter | G06F 11/2033 |
| | | | 707/682 |
| 2010/0191884 A1* | 7/2010 | Holenstein | G06F 16/2343 |
| | | | 707/613 |
| 2011/0173619 A1* | 7/2011 | Fish | G06F 16/2365 |
| | | | 718/101 |
| 2013/0246569 A1* | 9/2013 | Shen | H04L 67/10 |
| | | | 709/217 |
| 2014/0108367 A1 | 4/2014 | Kim et al. | |
| 2016/0092319 A1* | 3/2016 | Parkinson | G06F 9/466 |
| | | | 707/679 |
| 2020/0327097 A1* | 10/2020 | Birka | G06F 16/2358 |
| 2020/0351392 A1 | 11/2020 | Bomma et al. | |
| 2021/0034605 A1* | 2/2021 | Cai | G06F 16/27 |
| 2021/0124647 A1* | 4/2021 | Kasani | G06F 16/2219 |
| 2022/0058179 A1* | 2/2022 | Stolze | G06F 16/2379 |
| 2022/0067029 A1* | 3/2022 | Murthy | G06F 16/273 |
| 2022/0391382 A1* | 12/2022 | Schreter | G06F 16/27 |

FOREIGN PATENT DOCUMENTS

| | | |
|---|---|---|
| CN | 112598325 A | 4/2021 |
| CN | 112732820 A | 4/2021 |
| KR | 10-2109461 B1 | 5/2020 |

OTHER PUBLICATIONS

C. J. Date, "An Introduction to Database Systems", Jan. 1, 1985, pp. 1-19, Addison-Wesley, XP002029747.
Communication issued on Oct. 9, 2023 by the European Patent Office in European Patent Application No. 22175817.0.
European Search Report for EP22175817.0 issued on Sep. 22, 2022 from European patent office in a counterpart European patent application.
Yi Liu et al., "Efficient Transaction Nesting in Hardware Transactional Memory", Architecture of Computing Systems—ARCS 2010, pp. 138-149, Springer Berlin Heidelberg.

* cited by examiner

METHOD AND APPARATUS FOR PROCESSING TRANSACTION

CROSS-REFERENCE TO RELATED APPLICATION AND CLAIM OF PRIORITY

This application claims the benefit under 35 USC § 119 of Korean Patent Application No. 10-2021-0069115 filed on May 28, 2021 in the Korean Intellectual Property Office, the entire disclosure of which is incorporated herein by reference for all purposes.

BACKGROUND

1. Technical Field

The present disclosure relates to a method and apparatus for processing a transaction. More particularly, the present disclosure relates to a method and apparatus for processing a series of database transaction groups sequentially requested by a plurality of applications in a microservice architecture (MSA) environment.

2. Description of the Related Art

A microservice architecture (MSA) refers to an architecture that divides one service function into several small unit service functions (e.g., an application) and performs the entire service function using the divided service functions. The advantage of the MSA is that it is easy to change and maintain service functions as the entire service is implemented as an independent service function.

The divided service functions perform independent transactions for a database.

FIG. 1 is a view illustrating an MSA, and illustrates a plurality of applications in charge of each independent service function. Each of the plurality of applications may request transactions to databases, and each of the applications may be hierarchically connected to each other. For example, an application A may be an application in the highest layer, and an application D may be an application in the lowest layer.

According to the hierarchical structure of these applications, the applications may be called in the order of an application A, an application B, an application C and application D in order to process an entire transaction. According to such calling order, the application D may request a transaction #1 to the database and then return a result of processing the transaction #1 to the application C, the application C may a transaction #2 to the database and then return a result of processing the transaction #2 to the application B, and the application B may request a transaction #3 to the database and then return a processing result of the transaction #3 to the application A. Finally, the application A may request a transaction #4 to the database and then process the transaction #4.

As described above, in the MSA environment, each of the applications sequentially processes different transactions. However, when an error occurs in any one of the transactions associated with each other, a previously processed transaction may not be rolled back. For example, in the state where the application D processes the transaction #1 and the application C processes the transaction #2, an error may occur during processing of the transaction #3 by the application B. In that case, the transaction #3 may be rolled back in the database, but the transactions #1 and #2 processed before the transaction #3 are not rolled back, and accordingly, the data associated with transactions #1 and #2 are inconsistent with those associated with the transaction #3.

In preparation for such a case, a centralized management method where a controller is built in the center and a central controller manages the transactions for each of the applications may be considered. However, in the centralized management method, when the central controller is heavily loaded to have a breakdown, the entire system may be paralyzed. In addition, the centralized management method can be applied only to the same database management system (DBMS) and, therefore, cannot be applied to systems including a heterogeneous DBMS.

Meanwhile, each of the applications may be considered to be equipped with a function for monitoring errors in transactions and rolling back the errors therein. However, the costs of developing applications may increase due to the installation of an additional function for monitoring transactions in an application, and if there is a change in the additional function for monitoring the transactions, the entire application must be stopped. When the application is stopped for a logic change in this way, the operation of the entire system also stops.

SUMMARY

Technical aspects to be achieved through one embodiment by the present invention provide a method and apparatus for processing a series of database transaction groups to ensure data consistency in an MSA environment.

Other technical aspects to be achieved through one embodiment by the present invention provide a method and apparatus for processing a transaction applicable to systems including a variety of heterogeneous DBMSs.

Still another technical aspect to be achieved through one embodiment by the present invention provides a method and apparatus for processing a transaction having excellent expandability and compatibility.

Still another technical aspect to be achieved through one embodiment by the present invention provides a method and apparatus that can change a logic for rolling back data without interruption of an application.

Still another technical aspect to be achieved through one embodiment by the present invention provides a method and apparatus for processing a transaction that can reprocess a rollback of the transaction even if the rollback of the transactions fails.

The technical aspects of the present invention are not restricted to those set forth herein, and other unmentioned technical aspects will be clearly understood by one of ordinary skill in the art to which the present disclosure pertains by referencing the detailed description of the present disclosure given below.

According to the present disclosure, a method for processing a series of database transactions, wherein the method processes, by a computing device, a series of database transaction groups sequentially requested by a plurality of applications are provided. The method may include, recording a first transaction requested to a first database by a first application, among the plurality of applications, in association with a transaction group ID, recording a second transaction requested to a second database by a second application called by the first application, among the plurality of applications, in association with the transaction group ID, rolling back the second transaction targeted to the second database in response to a determination that an error has occurred during processing of the second transaction, identifying the first transaction based on the transaction group ID, and rolling back the first transaction targeted to the first database.

In some embodiments, the first database and the second database are distinguished from each other.

In some embodiments, when the second application is called by the first application, the transaction group ID is transmitted to the second application by the first application.

In some embodiments, the method for processing a series of database transactions further includes, recording a third transaction requested to a third database by a third application called by the second application, among the plurality of applications, in association with the transaction group ID, rolling back the third transaction targeted to the third database in response to a determination that an error has occurred during processing of the third transaction, identifying the second transaction and the first transaction based on the transaction group ID; and sequentially rolling back the second transaction and the first transaction.

In some embodiments, an operation of recording the first transaction requested to the first database is triggered by the first database.

In some embodiments, the recording of a first transaction requested to a first database in association with a transaction group ID may include recording a value of a data entry to be updated, before an update by the first transaction, when the first transaction is a data update transaction, and wherein the rolling back of the first transaction targeted to the first database includes rolling back the first transaction using the recorded value of the data entry to be updated.

In some embodiments, the recording of a first transaction requested to a first database in association with a transaction group ID may include recording a value of a data entry to be deleted, before deletion by the first transaction, when the first transaction is a data deletion transaction, and wherein the rolling back of the first transaction targeted to the first database includes rolling back the first transaction using the recorded value of the data entry to be deleted.

In some embodiments, the determination that an error has occurred during processing of the second transaction is based on data recorded in a shared storage.

In some embodiments, a method for processing a series of database transactions further includes deleting recording of the first transaction and recording of the second transaction, in response to a determination that the first transaction and the second transaction have been successfully processed.

In some embodiments, a method for processing a series of database transactions further including deleting the recording of the first transaction and the recording of the second transaction, in response to a determination that the first transaction and the second transaction have been successfully rolled back.

In some embodiments, a method for processing a series of database transactions further including maintaining the recording of the first transaction and the recording of the second transaction, in response to a determination that an error has occurred during the rolling back of the first transaction or the second transaction.

In some embodiments, the recording of the second transaction in association with the transaction group ID may include recording the second transaction in a lower layer of the first transaction.

According to another aspect of the present disclosure, a computing device may include one or more processors; a memory configured to load a computer program executed by the processor; and a storage configured to the computer program are provided. The computer program may include instructions for performing operations of recording a first transaction requested to a first database by a first application, among a plurality of applications, in association with a transaction group ID, recording a second transaction requested to a second database by a second application called by the first application, among the plurality of applications, in association with the transaction group ID, rolling back the second transaction targeted to the second database in response to a determination that an error has occurred during processing of the second transaction, identifying the first transaction based on the transaction group ID; and rolling back the first transaction targeted to the first database.

According to another aspect of the present disclosure, a computer readable non-transitory recording medium including instructions that, when executed by a processor, cause the processor to perform operations may include, recording a first transaction requested to a first database by a first application, among a plurality of applications, in association with a transaction group ID, recording a second transaction requested to a second database by a second application called by the first application, among the plurality of applications, in association with the transaction group ID, rolling back the second transaction targeted to the second database in response to a determination that an error has occurred during processing of the second transaction, identifying the first transaction based on the transaction group ID; and rolling back the first transaction targeted to the first database.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
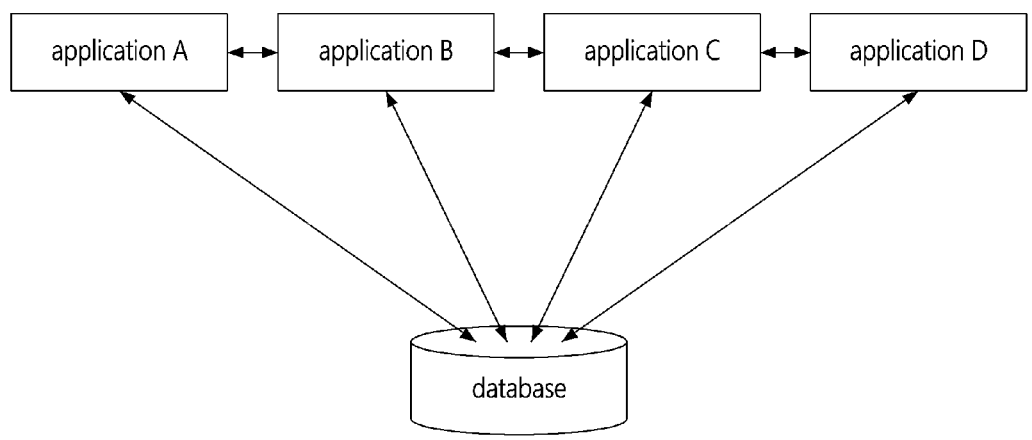
FIG. 1 is a view illustrating the MSA.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Figure 2:
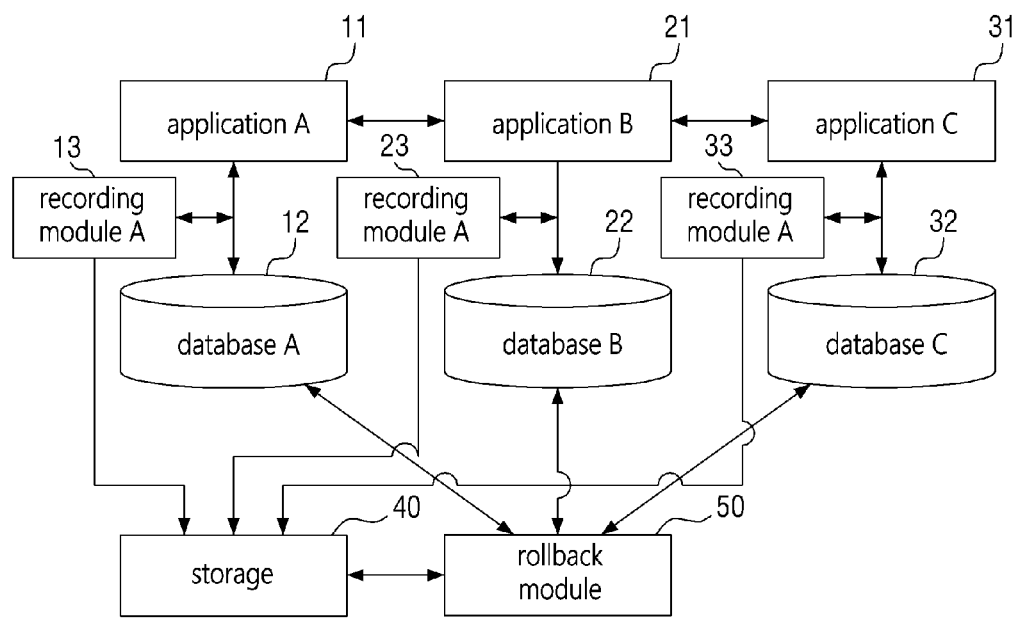
FIG. 2 is a view illustrating a system for processing a transaction according to one embodiment of the present disclosure.

Hereinafter, embodiments of the present disclosure will be described with reference to the attached drawings FIG. 2 is a view illustrating a system for processing a transaction according to one embodiment of the present disclosure.

Referring to FIG. 2, the system for processing a transaction according to one embodiment of the present disclosure may include a plurality of applications 11, 21, and 31, a plurality of databases 12, 22, and 32, recording modules 13, 23, and 33, a storage 40, and a rollback module 50.

The plurality of applications 11, 21, and 31 may perform a function for distributing services for clients and transactions accompanying the services in the micro-service architecture (MSA) environment. The plurality of applications 11, 21, and 31 may process a series of database transaction groups. The transaction groups may include a plurality of transactions. Each of the applications 11, 21, and 31 may process its own transaction using data included in the databases 12, 22, and 32 that they access. For example, when a task is divided into a transaction A, a transaction B and a transaction C, an application A 11 may request the transaction A to a database A 12, and an application B 21 may request the transaction B to a database B 22. The databases 12, 22, and 32 may read, update, delete, or store new data based on the requested transactions.

Each of the applications 11, 21, and 31 may have a hierarchical structure to process the transactions. When the task is requested, the applications 11, 12, and 13 may be sequentially called in the order of the highest application 11 to the lowest application 31. Furthermore, transaction group IDs may be transmitted to the called applications 11, 21, and 31.

Figure 3:
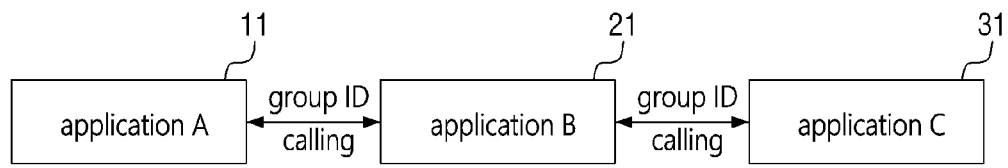
FIG. 3 is a view illustrating the order in which applications are called.

FIG. 3 is a view illustrating the order in which applications are called, and the applications may be called in the order of applications A, B, and C, and also, when the applications are called, the transaction group IDs may be transmitted to the called applications. The transaction group IDs may be allocated by the application A 11 or the recording module A 13 which is initially disposed. In one embodiment, when the task is requested, the application A 11 may allocate the transaction group IDs for processing the task. In another embodiment, when the application A 11 starts to process a new task, the recording module A 13 may allocate the transaction group IDs and may transmit the allocated transaction group IDs to the application A 11.

Each of the databases 12, 22, and 32 may store data and mount DBMSs therein. Each of the databases 12, 22, and 32 may be databases 12, 22, and 32 that are distinguished from each other. For example, each of the databases 12, 22, and 32 may be physically or logically distinguished from each other. In addition, different DBMSs may be mounted in each of the databases 12, 22, and 32. For example, different DBMSs may be mounted in the database A 12, the database B 22, and the database C 32, respectively. The databases 12, 22, and 32 may request a record of the transactions to the recording modules 13, 23, and 33 via a trigger function provided by themselves. The trigger function may be provided via the DBMS. Furthermore, the databases 12, 22, and 32 may provide the recording modules 13, 23, and 33 with a value of an entry to be updated or a value of an entry to be deleted, before changing the databases 12, 22, and 32, using the trigger function. The value of the entry to be updated is data stored in the databases 12, 22, and 32 before processing an update transaction, which is data changed as the update transaction is processed. In addition, the value of the entry to be deleted is data stored in the databases 12, 22, and 32 before processing a deletion transaction, which is data deleted as the deletion transaction is processed.

The recording modules 13, 23, and 33 may record the transactions created in each of the applications 11, 21, and 31, as log data, in the storage 40. More specifically, the recording modules 13, 23, and 33 may record the transactions processed by the applications 11, 21, and 31 in the storage 40 in association with the transaction group ID. The transactions recorded in the storage 40 may include instructions and database identification information.

The recording modules 13, 23, and 33 may record the transactions requested to the databases 12, 22, and 32 by the applications 11, 21, and 31 in association with the transaction group ID. In one embodiment, when triggering occurs from the databases 12, 22, and 32, the recording modules 13, 23, and 33 may record the transaction requested to the databases 12, 22, and 32 in the storage 40 in association with the transaction group IDs. That is, the recording modules 13, 23, and 33 may record the transactions in the storage 40 in association with the transaction group IDs at the request of the databases 12, 22, and 32. In another embodiment, the recording modules 13, 23, and 33 may monitor operations of the applications 11, 21, and 31. Thereafter, when the transactions are requested to the databases 12, 22, and 32 for processing the transactions by the applications 11, 21, and 31, the recording modules 13, 23, and 33 may record the transactions in association with the transaction group IDs. Herein, the request for the transactions to the databases 12, 22, and 32 may be a request associated with access to the databases 12, 22, and 32, such as reading, updating, creating or deleting data of the databases 12, 22, and 32.

In one embodiment, the recording modules 13, 23, and 33 may record the transactions in the storage 40 in association with the transaction group ID when the transactions requested to the databases 12, 22, and 32 are transactions that fluctuate the databases 12, 22, and 32. For example, when the transaction is any one of a data update transaction, a data deletion transaction, and a data creation transaction, the recording modules 13, 23, and 33 may store the transaction in the storage 40 in association with the transaction group ID.

The recording modules 13, 23, and 33 may determine whether the transaction requested to the databases 12, 22, and 32 is normally processed, and may display the transaction determined as an error on the storage 40. In one embodiment, the recording modules 13, 23, 33 may record an error flag in the transaction determined as the error. In one embodiment, the recording modules 13, 23, and 33 may be included in the system by as many as the number of applications, and in some embodiments, one recording module 13, 23, or 33 may be included in the system.

The storage 40 is a storing means that may be used for public use, and may include a local storage and a network storage. In the storage 40, a plurality of transactions with a hierarchical structure may be recorded in association with the transaction group ID.

Figure 4:
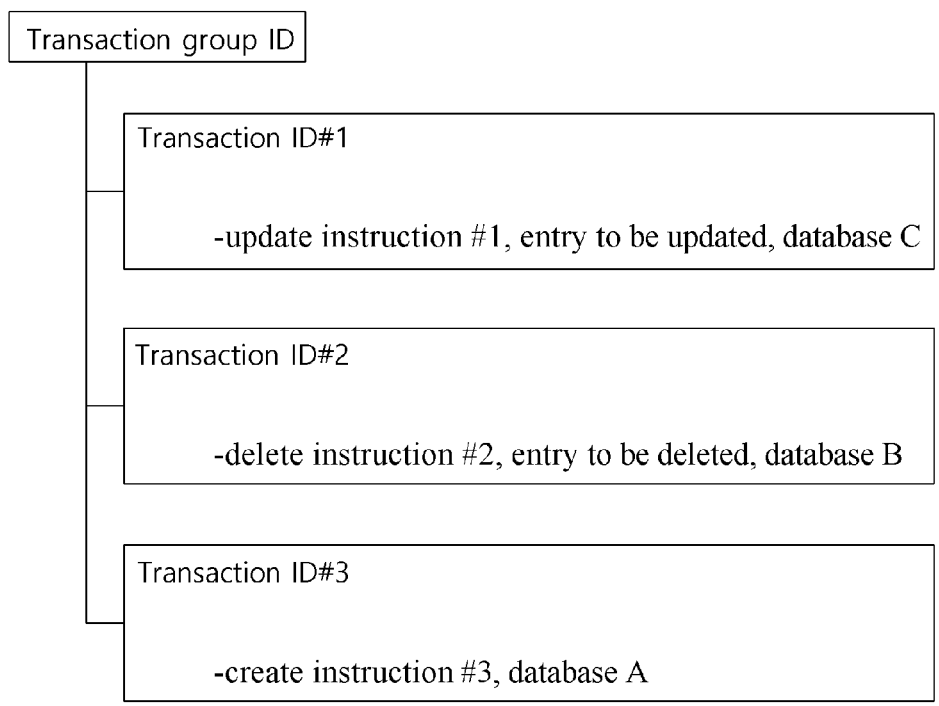
FIGS. 4 and 5 are views illustrating a transaction with a hierarchical structure recorded in a storage.

FIG. 4 is a view illustrating transactions with a hierarchical structure, each of which may be stored in the storage 40 in association with the transaction group ID. As illustrated in FIG. 4, the IDs may be also allocated and managed to the transactions. The transaction IDs may be allocated and recorded by the recording modules 13, 23, and 33.

Referring to FIG. 4, a transaction in the highest layer may be a transaction having ID #1, while a transaction in the lowest layer may be a transaction having ID #3. Herein, the transaction in the highest layer may be a first processed transaction, while the transaction in the lowest layer may be a last processed transaction. In addition, the transactions may be associated with the value of the entry to be updated or deleted, and they may be recorded in the storage 40.

Figure 5:
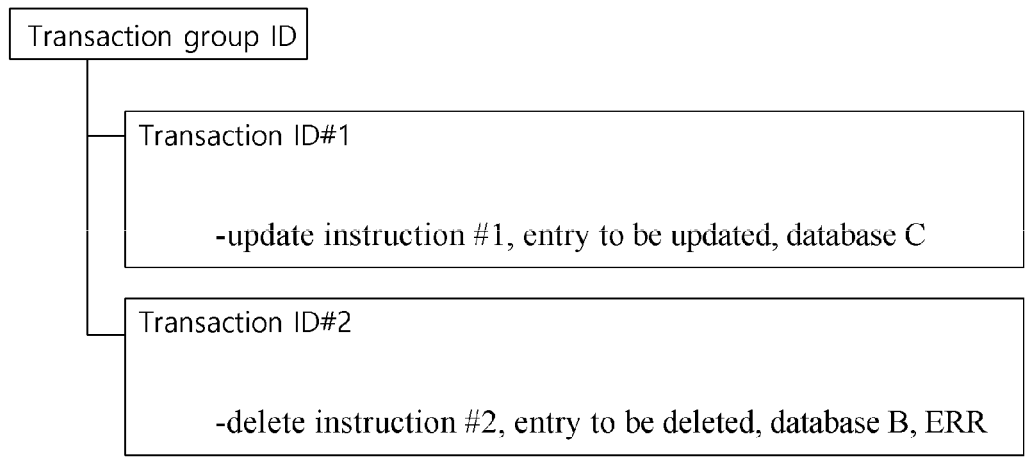

FIG. 5 is a view illustrating another transaction with a hierarchical structure, and as illustrated in transaction ID #2 of FIG. 5, an error flag ERR indicating a transaction error may be recorded in association with the transaction. The error flag may be used for rolling back the transaction, as will be described below.

The rollback module 50 may roll back the transaction targeted to one or more databases 12, 22, and 32 in response to a determination that an error has occurred during processing of the transaction. The rollback module 50 may identify the transaction to be rolled back based on the plurality of transactions recorded in the storage 40. In one embodiment, the rollback module 50 may identify the transaction to be rolled back based on the error flag indicated in the transaction. The rollback module 50 may identify the transaction in which the error flag is indicated, and may roll back the transaction. In one embodiment, the rollback module 50 may identify database identification information included in the identified transaction, and may roll back the transaction targeted to the databases 12, 22, and 32 corresponding to the identification information. Furthermore, the rollback module 50 may identify other transactions in an upper layer associated with the rolled back transaction, and may roll back the other identified transactions.

According to the system for processing a transaction in the present embodiment, the recording modules 13, 23, and 33 may monitor the transactions to record transaction-related data in the storage 40, and may perform the rollback based on the transactions recorded in the storage 40. That is, according to the present embodiment, the transaction-related recording and the transaction rollback are performed independently of operations of the applications 11, 21, and 31. Therefore, when logic is to be changed, it is possible to change the logic of the recording modules 13, 23, and 33 and the rollback module 50 without stopping the operations of the applications 11, 21, and 31, resulting in changing the logic without adversely affecting the entire system.

In addition, according to the present embodiment, since the databases 12, 22, and 32 are rolled back based on the transaction data recorded in the storage 40, the rolling back does not depend on the DBMS. Accordingly, the system may be also applied to a system environment included in various types of DBMSs, thus resulting in excellent expandability and compatibility.

Figure 6:
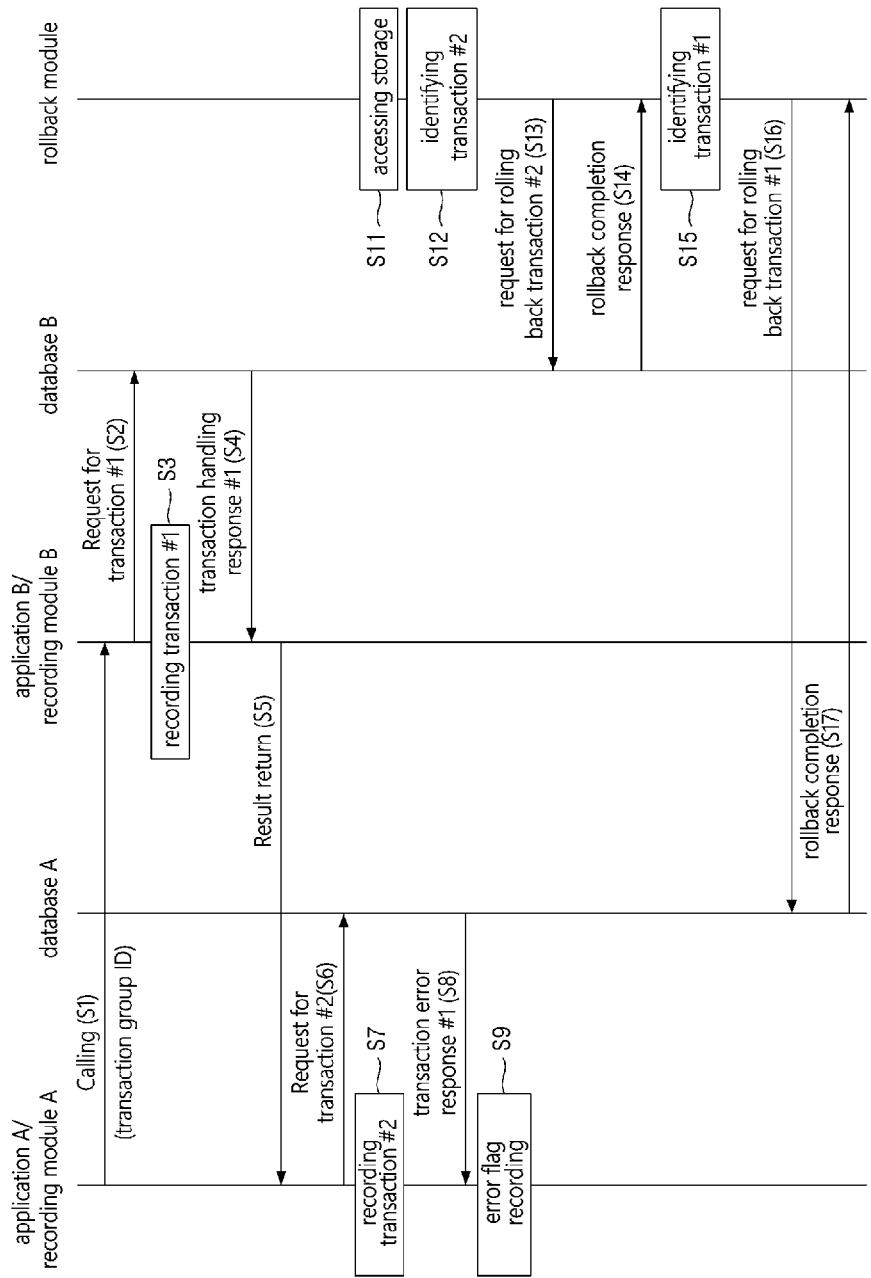
FIG. 6 is a signal flowchart for explaining a method for processing a transaction according to the other embodiment of the present disclosure.

FIG. 6 is a signal flowchart for explaining a method for processing a transaction according to the other embodiment of the present disclosure.

Referring to FIG. 6, it is assumed that an application B 21 is an application in which the lowest layer is disposed.

Referring to FIG. 6, the application A 11 may call the application B 21 in order to process a requested task (S1). In that case, the application A 11 may transmit the transaction group ID to the application B 21.

Subsequently, the application B 21 may request the transaction #1 to the database B 22 in order to distribute the task, and may cause the transaction #1 to be processed in the database B 22 (S2). Next, the recording module B 23 may record the transaction #1 in the storage 40 in associated with the transaction group ID (S3).

When a response that the transaction #1 was normally processed is received from the database B 22 (S4), the application B 21 may return a result of processing the transaction #1 to the application A 11 (S5). Thereafter, the application A 11 may request the transaction #2 to the database A12 (S6). Next, the recording module A 13 may record the transaction #2 in the storage 40 in association with the transaction group ID (S7). In that case, the transaction #2 may be recorded in a lower layer of the transaction #1.

An error may occur while the transaction #2 is being processed by database A12. In that case, the application A 11 may receive an error response for the transaction #2 from the database B22 (S8). Subsequently, the recording modules 13, 23, and 33 may record an error flag in association with the transaction #2.

In a state where the transaction #2 in which the error flag is indicated is stored in the storage 40 in this way, the rollback module 50 may access the storage 40 (S11) and identify the transaction #2 in which the error flag is indicated (S12). The rollback module 50 may perform a process for sequentially rolling back all the transactions associated with the transaction group ID by identifying the error flag. First, the rollback module 50 may request, to the database B 22, a rollback for transaction #2 in which the error flag is indicated (S13). When the database B 22 normally completes the rollback for the transaction #2, the rollback module 50 may receive a rollback completion response from the database B 22 (S14).

Next, the rollback module 50 may identify a transaction #1 which is another transaction associated with the transaction group ID (S15). The rollback module 50 may request a rollback for the transaction #1 to the database A 12 (S16). When the database A 12 normally completes the rollback for the transaction #1, the rollback module 50 may receive a rollback completion response from the database A 12 (S17).

According to the present embodiment, the plurality of transactions created for distributing the tasks are managed as a group, and when any one of the plurality of transactions has an error, the transactions are rolled back in reverse order, thus ensuring consistency of data stored in the databases 12, 22, and 32.

The recording modules 13, 23, and 33 and the rollback module 50 according to the aforementioned embodiments may be included and operated in a computing device.

Hereinafter, referring to FIGS. 7 to 10, a method for processing a transaction that is performed by the computing device including the recording modules 13, 23, and 33 and the rollback module 50 will be described below.

Figure 7:
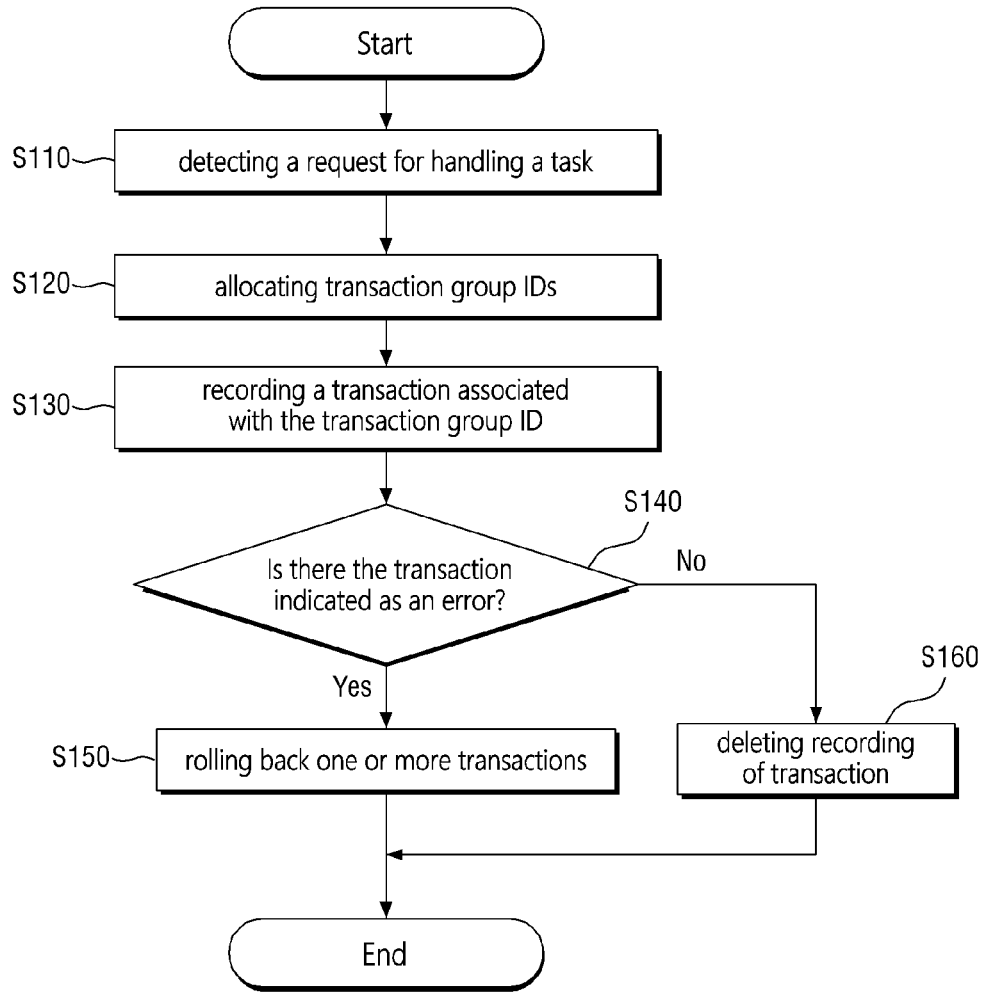
FIG. 7 is a flowchart of a method for processing a transaction according to another embodiment of the present disclosure.

FIG. 7 is a flowchart of a method for processing a transaction according to another embodiment of the present disclosure.

Each step of the method illustrated in FIG. 7 may be performed by the computing device. In other words, each step of the method may be implemented with one or more instructions executed by a processor of the computing device. First steps included in the present method may be performed by a first computing device, and second steps of the present method may be performed by a second computing device. Hereinafter, a further description will be continued assuming that each step of the present method is performed by the computing device including the recording modules 13, 23, and 33 and the rollback module 50 described with reference to FIG. 1; however, the subject of performing each step is only an example, and the present disclosure is not limited to the following description. For the convenience of explanation, the description of the subject of performing some steps included in the method may be omitted.

Referring to FIG. 7, the recording modules 13, 23, and 33 included in the computing device may detect a request for processing the task (S110). Subsequently, the recording modules 13, 23, and 33 may allocate the transaction group IDs for the task (S120). In some embodiments, the applications 11, 21, and 31 may allocate the transaction group IDs. In that case, the recording modules 13, 23, and 33 may obtain the transaction group ID from the applications 11, 21, and 31.

Subsequently, when the transaction is requested to the databases 12, 22, and 32 by the applications 11, 21, and 31, the recording modules 13, 23, and 33 may record the transaction in the storage 40 in association with the transaction group ID (S130). As illustrated in FIGS. 4 and 5, the recording modules 13, 23, and 33 may record the one or more transactions in association with the transaction group ID. The step S130 will be described in more detail referring to FIGS. 8 and 9.

The rollback module 50 included in the computing device may access the storage 40 to determine whether or not there is the transaction indicated as the error (i.e., having the error flag) (S140).

Figure 10:
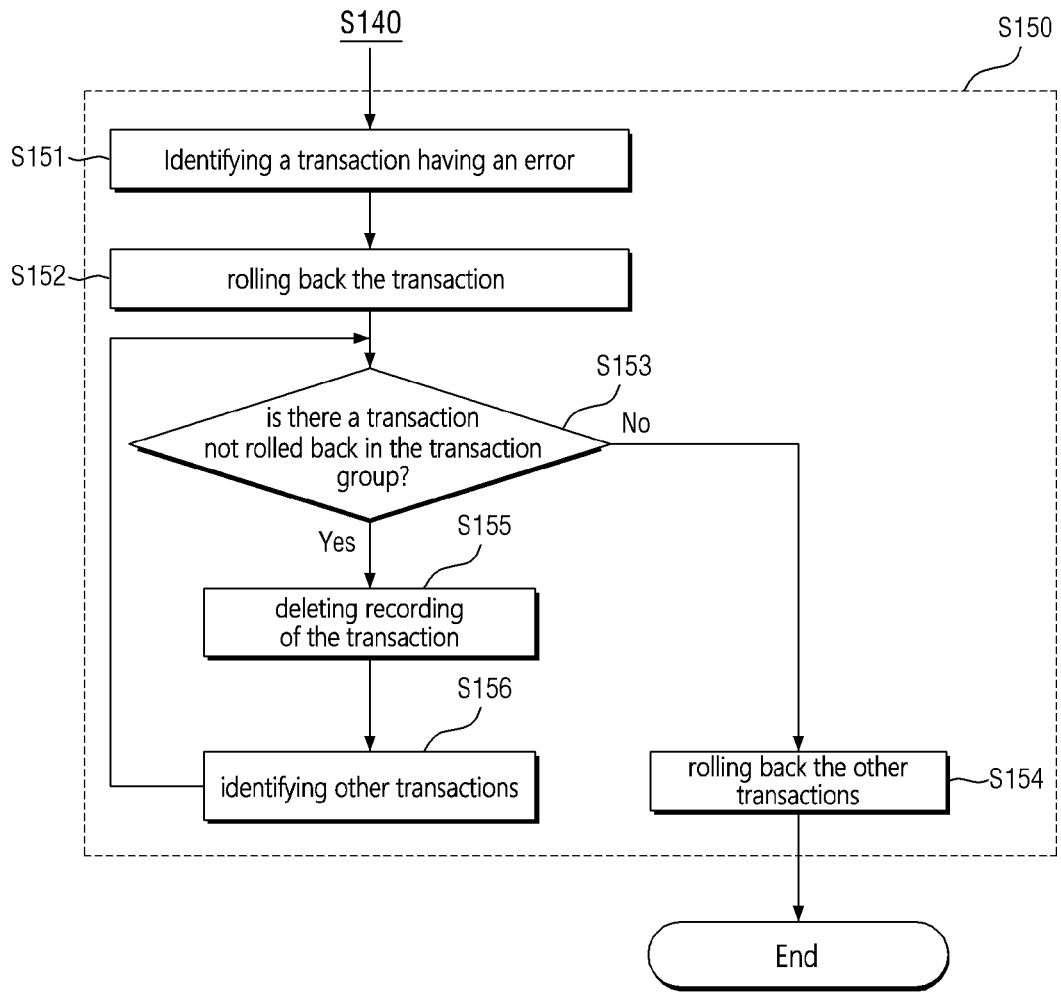
FIG. 10 is a view for explaining in detail step S150 described referring to FIG. 7.

The rollback module 50 may roll back the one or more transactions in association with the transaction group ID in response to the determination that the transaction indicated as the error is present (S150). When there are a plurality of transactions associated with the transaction group ID, the rollback module 50 may roll back the transactions sequentially from the transaction in a lower layer to the transaction in the upper layer. As described above, the transaction in the upper layer is a transaction that was processed relatively early, while the transaction in the lower layer is a transaction that was processed relatively late. Referring to FIG. 10, the step S150 will be described in more detail below.

Meanwhile, if there is no transaction indicated as an error as a result of the determination in the step S140, the rollback module 50 may delete the one or more transactions associated with the transaction group ID from the storage 40 (S160).

Hereinafter, referring to FIG. 8, the step S130 described with reference to FIG. 7 will be described in more detail below.

Figure 8:
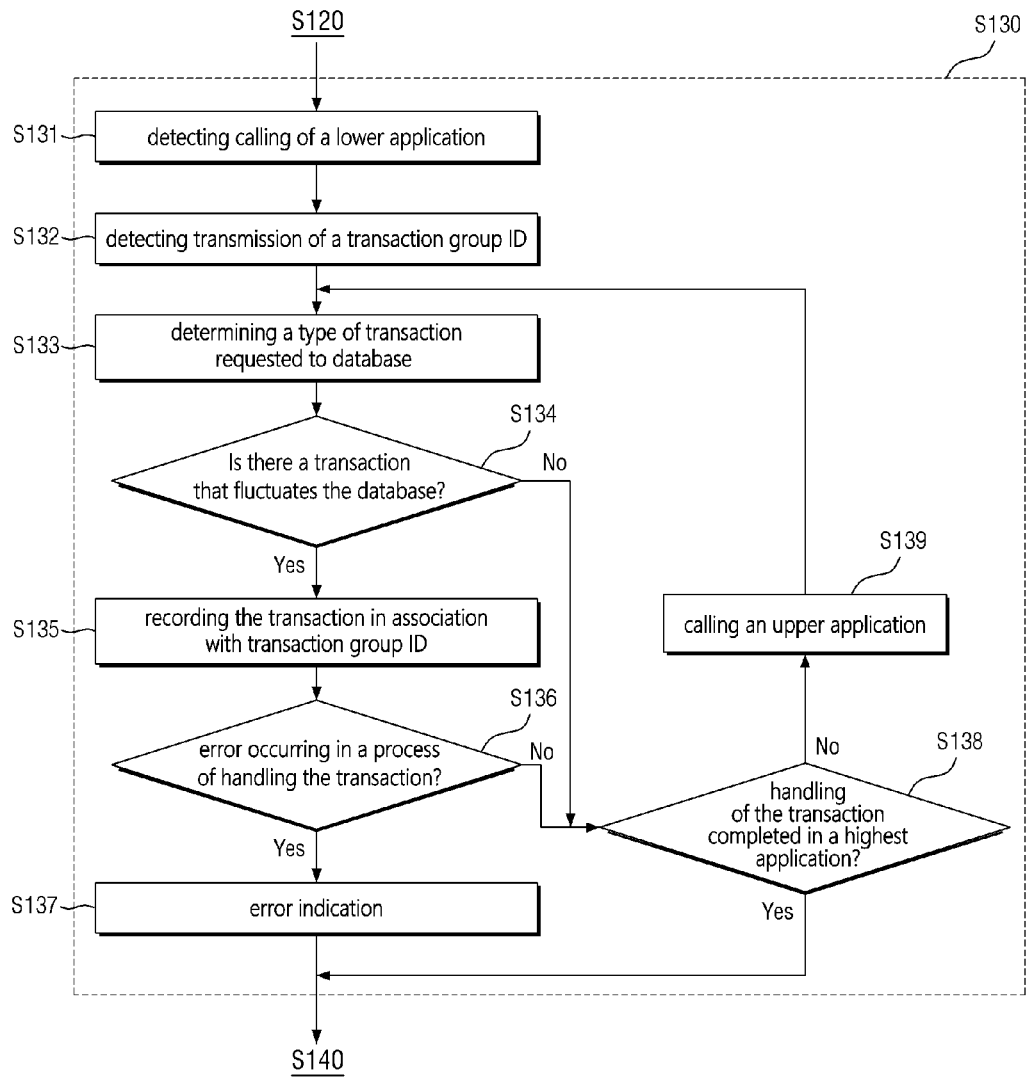
FIG. 8 is a view for explaining in detail step S130 described referring to FIG. 7.

Referring to FIG. 8, the lowest application will be detected to be called, and also, the transaction group ID may be detected to be transmitted from the upper transaction to the lower transaction (S131, S132). In other words, the upper application may call the lower application, and also, the computing device may also detect that the transaction group ID may be transmitted to the called lower application.

Subsequently, the recording modules 13, 23, and 33 included in the computing device may determine whether or not the transaction requested to the database by the called application is a type of transaction that fluctuates the database (S133). The type of transaction that fluctuates the database may include an update transaction, a deletion transaction, and a creation transaction. Herein, the update transaction may be a transaction for updating data included in the database with other data, the deletion transaction may be a transaction for deleting the data included in the database, and the creation transaction may be a transaction for creating and storing new data in the database.

Next, the recording modules 13, 23, and 33 may record the transaction in the storage 40 in association with the transaction group ID in response to the determination that the requested transaction is the transaction that fluctuates the database (S135). In one embodiment, the recording modules 13, 23, and 33 may store a previous entry value depending on the type of transaction. The step S135 will be described in more detail referring to FIG. 9.

Subsequently, the recording modules 13, 23, and 33 may determine whether an error occurs upon processing the transaction in the database by monitoring the transaction processed in the database (S136). In response to the determination that the error has occurred in the transaction, the recording modules 13, 23, and 33 may indicate the transaction as the error by recording the error flag associated with the transaction recorded in the step S135 (S137).

Meanwhile, when the requested transaction is not the transaction that fluctuates the database as a result of the step S134, or the transaction is normally processed in the database as a result of the step S136, it may be determined whether the transaction has been processed in the highest application (S138). When the transaction has not been processed in the highest application, the upper application may be called (S139). In that case, the recording modules 13, 23, 33 may resume the process from the step S134 targeted to the called upper application and the database. Herein, the transactions to be recorded later may be recorded in association with the transaction group ID, but recorded in the lower layer of the previously recorded transaction.

According to the present embodiment, a series of database transactions set as a group may be hierarchically recorded in the storage 40.

Hereinafter, referring to FIG. 9, the step S135 described with reference to FIG. 8 will be described in more detail below.

Figure 9:
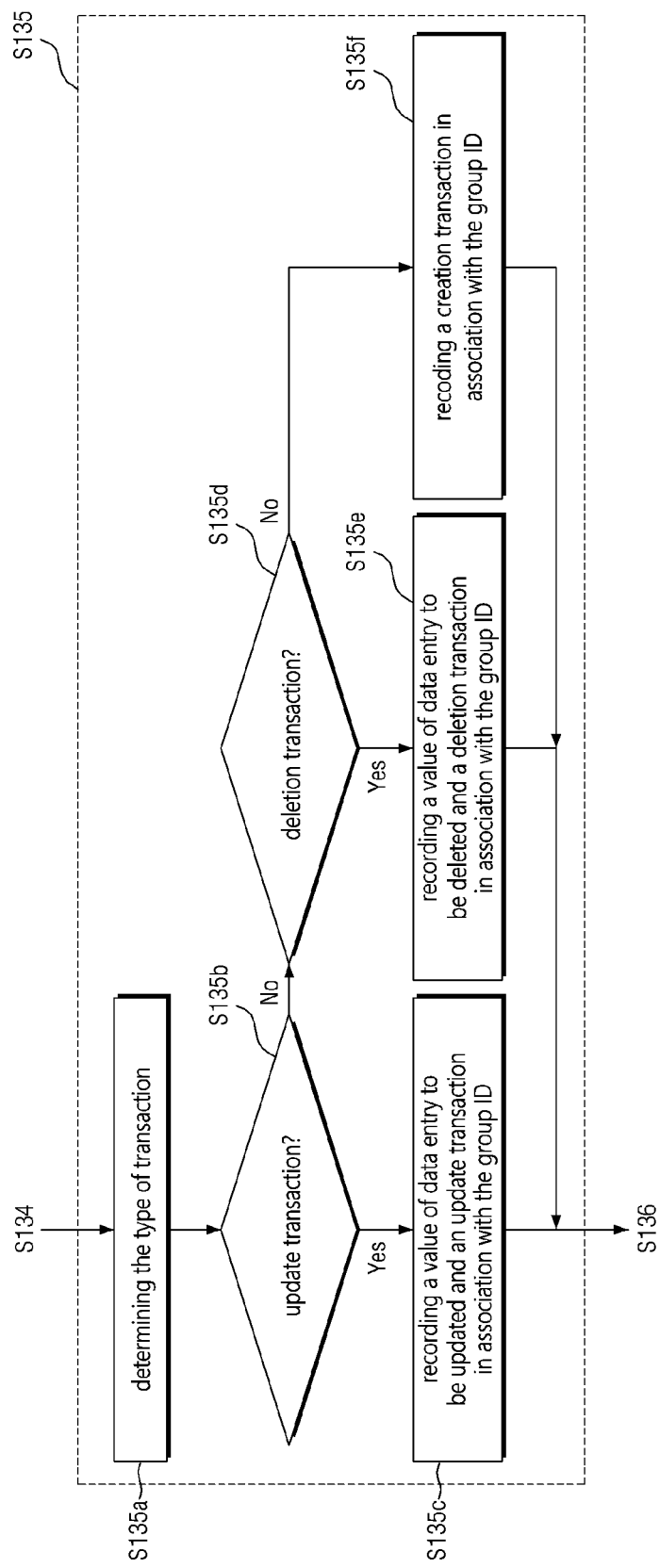
FIG. 9 is a view for explaining in detail step S135 described referring to FIG. 8.

Referring to FIG. 9, the recording modules 13, 23, and 33 may determine the type of the requested transaction (S135a).

In response to a determination that the transaction is the update transaction (Yes in S135*b*), the recording modules 13, 23, and 33 may record a value of a data entry to be updated and the update transaction in the storage 40 in association with the transaction group ID (S135*c*). That is, when the transaction is the update transaction, the update transaction may be recorded along with the value of the data entry to updated, so that the transaction may be recovered as the data before it is updated.

In response to the determination that the transaction is the deletion transaction (Yes in S135*d*), the recording modules 13, 23, and 33 may record the value of the data entry to be deleted and the deletion transaction in the storage 40 in association with the transaction group ID (S135*e*). That is, when the transaction is the deletion transaction, the deletion transaction may be recorded along with the value of the data entry to be deleted, so that the transaction may be recovered as the data before it is deleted.

In response to the determination that the transaction is the creation transaction (No in S135*d*), the recording modules 13, 23, and 33 may record the creation transaction in the storage 40 in association with the transaction group ID (S135*f*).

According to the present embodiment, when the error occurs during the processing of the transaction, an entry value of previous data may be recorded together to roll back the transaction, thus facilitating data recovery.

Hereinafter, referring to FIG. 10, the step S150 described with reference to FIG. 7 will be described in more detail below.

Referring to FIG. 10, the rollback module 50 may access the storage 40 to identify the transaction in which the error occurs (S151). Subsequently, the rollback module 50 may roll back the identified transaction (S152). In one embodiment, the rollback module 50 may roll back the databases 12, 22, and 32 by confirming identification information of the database included in the transaction and requesting the rollback of the transaction to the database corresponding to the identification information. In some embodiments, based on instructions included in the transaction, the rollback module 50 may roll back the databases 12, 22, and 32 by providing the databases with an instruction for recovering the data to a state before executing the instructions. For example, when the instruction is a creation instruction, a deletion instruction that deletes the created entry value for the creation instruction may be provided to the databases 12, 22, and 32.

In addition, when the transaction is the update transaction, the rollback module 50 may roll back the transaction using the value of the data entry to be updated, which was recorded in association with the update transaction. For example, the rollback module 50 may roll back the update transaction by transmitting, to the databases 12, 22, and 32, an update instruction that updates (recovers) the entry value of the data updated depending on the update transaction to the value of the recorded entry to be updated.

Meanwhile, when the transaction is the deletion transaction, the rollback module 50 may roll back the transaction using the value of the data entry to be deleted, which was recorded in association with the deletion transaction. For example, the rollback module 50 may roll back the deletion transaction by providing the databases 12, 22, and 32 with a creation instruction in which the value of the data entry to be deleted is created again.

Subsequently, the rollback module 50 may determine whether a transaction not rolled back is present among the transactions recorded in association with the transaction group ID (S153).

As a result of the determination in the step S153, when all the transactions recorded in association with the transaction group ID are determined to have been rolled back, the rollback module 50 may delete the transaction group ID and the transaction associated with the transaction group ID from the storage 40 (S154).

As a result of the determination in the step S153, when a transaction that was not rolled back remains in association with the transaction group ID, the rollback module 50 may identify another transaction that was not rolled back among the transactions recorded in association with the transaction group ID (S155). In one embodiment, the rollback module 50 may identify other transactions disposed higher than the rolled back transaction. Then, the rollback module 50 may roll back the other identified transactions (S156).

Meanwhile, although the rollback module 50 attempts to roll back the transaction, the rollback may not be normally processed in the database. In that case, the rollback module 50 may continuously leave the record of the transaction stored in the storage and later roll back transaction again based on the transaction recorded in the storage 40.

According to the present embodiment, when the error occurs in any one of the transactions set as the group, all transactions are rolled back, resulting in solving a problem of data inconsistency caused by the error in some transactions.

Figure 11:
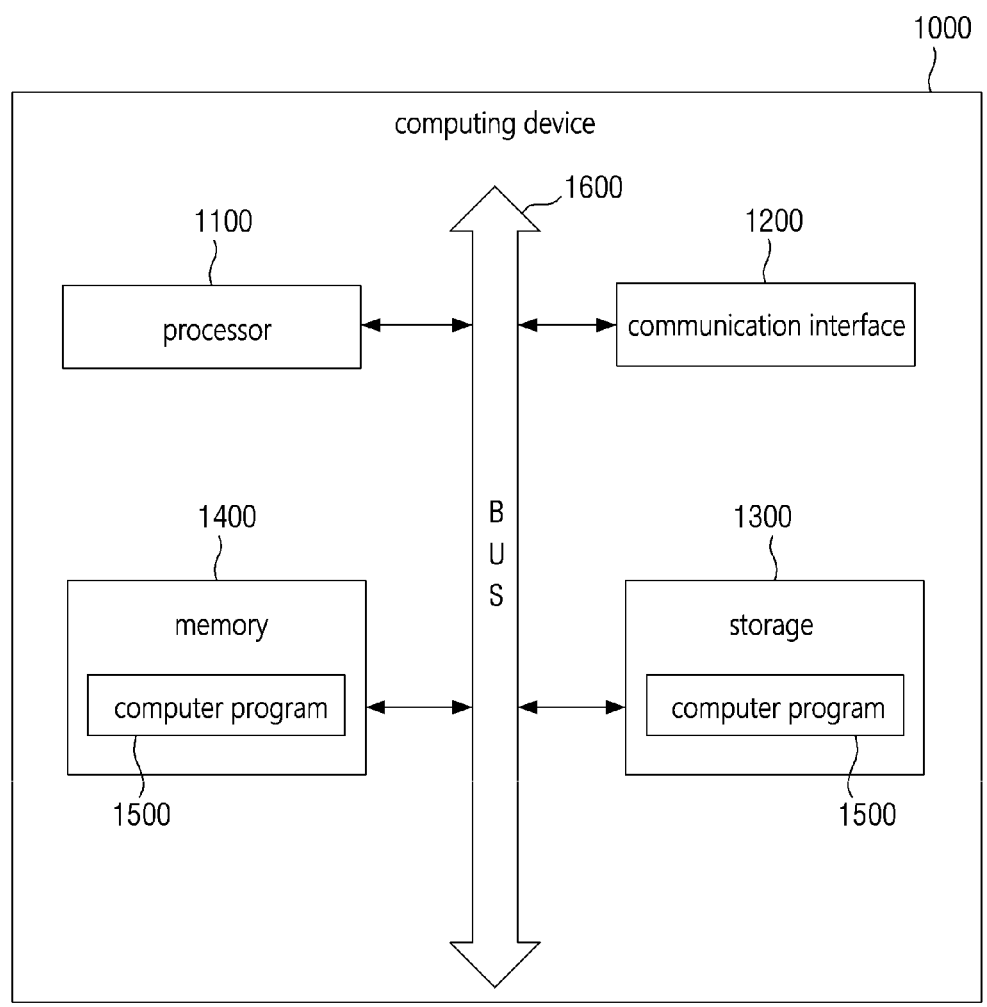
FIG. 11 is an exemplary view illustrating a hardware configuration that can implement a computing device in a variety of embodiments.

FIG. 11 is an example hardware diagram illustrating a computing device 1000. For example, a computing device 1000 depicted in FIG. 11 may be a hardware device which implement the data management device 100 depicted in FIG. 1.

As shown in FIG. 11, the computing device 1000 may include one or more processors 1100, a bus 1600, a communication interface 1200, a memory 1400, which loads a computer program 1500 executed by the processors 1100, and a storage 1300 for storing the computer program 1500. However, FIG. 11 illustrates only the components related to the embodiment of the present disclosure. Therefore, it will be appreciated by those skilled in the art that the present disclosure may further include other general purpose components in addition to the components shown in FIG. 11.

The processor 1100 controls overall operations of each component of the computing device 1000. The processor 1100 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 1100 may perform calculations on at least one application or program for executing a method/ operation according to various embodiments of the present disclosure. The computing device 1000 may have one or more processors.

The memory 1400 stores various data, instructions and/or information. The memory 1400 may load one or more programs 1500 from the storage 1300 to execute methods/ operations according to various embodiments of the present disclosure. An example of the memory 1400 may be a RAM, but is not limited thereto.

The bus 1600 provides communication between components of the computing device 1000. The bus 1600 may be implemented as various types of bus such as an address bus, a data bus and a control bus.

The communication interface 1200 supports wired and wireless internet communication of the computing device 1000. The communication interface 1200 may support various communication methods other than internet communication. To this end, the communication interface 1200 may be configured to include a communication module well known in the art of the present disclosure.

The storage 1300 can non-temporarily store one or more computer programs 1500. The storage 1300 may be configured to include a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 1500 may include one or more instructions, on which the methods/operations according to various embodiments of the present disclosure are implemented. For example, the computer program 1500 may include recording a first transaction requested to a first database by a first application, among the plurality of applications, in association with a transaction group ID. When the computer program 1500 is loaded on the memory 1400, the processor 1100 may perform the methods/operations in accordance with various embodiments of the present disclosure by executing the one or more instructions. The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A method for processing a series of database transactions requested sequentially by a plurality of applications comprising a first application and a second application, the method performed by a computing device, the method comprising:
    recording a first transaction requested to a first database by the first application, in association with a transaction group identifier (ID), wherein the first database has a first database management system (DBMS) mounted thereon;
    recording a second transaction requested to a second database distinguished from the first database by the second application called by the first application, among the plurality of applications, in association with the transaction group ID, wherein the second database has a second DBMS mounted thereon, the first DBMS and the second DBMS being heterogeneous DBMSs, wherein the plurality of applications are recorded with multiple layers in a sequential order in which the multiple layers are called and processed, a transaction in a highest layer being a firstly processed transaction and a transaction in a lowest layer being a last processed transaction, the second transaction being in a lower layer than a layer of the first transaction, and wherein each of the plurality of applications is assigned with a corresponding transaction ID;
    based on a determination that an error has occurred during processing of the second transaction, recording an error flag in association with a transaction ID of the second transaction;
    identifying the error flag indicated in the second transaction and rolling back the second transaction targeted to the second database;
    identifying the first transaction that is in an upper layer of the second transaction associated with the transaction group ID, wherein an error flag has not been recorded in the first transaction; and
    rolling back the first transaction targeted to the first database,
    wherein the rolling back of the first transaction and the rolling back of the second transaction are performed by a rollback module independently of the first application and the second application, the rollback module being separate from the first application and the second application, and
    wherein, when a logic of the rollback module for rolling back data is changed, the logic is changed without interrupting the first application and the second application.

2. The method of claim 1, wherein, when the second application is called by the first application, the transaction group ID is transmitted to the second application by the first application.

3. The method of claim 1, wherein the plurality of applications further comprises a third application; and the method further comprises:
    recording a third transaction requested to a third database by the third application called by the second application, in association with the transaction group ID;
    determining whether an error has occurred during processing of the third transaction;
    rolling back the third transaction targeted to the third database in response to a determination that the error has occurred during processing of the third transaction;
    identifying the second transaction and the first transaction, based on the transaction group ID; and
    sequentially rolling back the second transaction and the first transaction.

4. The method of claim 1, wherein the recording of the first transaction comprises receiving, from the first database via a trigger function of the first DBMS, a request for a record of the first transaction, and recording the first transaction in response to the request.

5. The method of claim 1, wherein, when the first transaction is a data update transaction, the recording of the first transaction comprises recording a value of a data entry to be updated, before an update by the first transaction; and the rolling back of the first transaction comprises rolling back the first transaction using the recorded value of the data entry to be updated.

6. The method of claim 1, wherein, when the first transaction is a data deletion transaction, the recording of the first transaction comprises recording a value of a data entry to be deleted, before deletion by the first transaction; and the rolling back of the first transaction comprises rolling back the first transaction using the recorded value of the data entry to be deleted.

7. The method of claim 1, wherein the determination that the error has occurred during processing of the second transaction is based on data recorded in a shared storage.

8. The method of claim 1, further comprising deleting recording of the first transaction and recording of the second transaction, in response to a determination that the first transaction and the second transaction have been successfully processed.

9. The method of claim 1, further comprising deleting the recording of the first transaction and the recording of the second transaction, in response to a determination that the first transaction and the second transaction have been successfully rolled back.

10. The method of claim 1, further comprising maintaining the recording of the first transaction and the recording of the second transaction, in response to a determination that an error has occurred during the rolling back of at least one of the first transaction and the second transaction.

11. A computing device, comprising:
one or more processors;
a memory configured to load a computer program executed by the one or more processors; and
a storage configured to the computer program,
wherein the computer program comprises instructions for processing a series of database transactions requested sequentially by a plurality of applications comprising a first application and a second application, and the instructions comprise instructions for performing operations of:
recording a first transaction requested to a first database by the first application, among the plurality of applications, in association with a transaction group identifier (ID), wherein the first database has a first database management system (DBMS) mounted thereon;
recording a second transaction requested to a second database distinguished from the first database by the second application called by the first application, among the plurality of applications, in association with the transaction group ID, wherein the second database has a second database management system (DBMS) mounted thereon, the first DBMS and the second DBMS being heterogeneous DBMSs, wherein the plurality of applications are recorded with multiple layers in a sequential order in which the multiple layers are called and processed, a transaction in a highest layer being a firstly processed transaction and a transaction in a lowest layer being a last processed transaction, the second transaction being in a lower layer than a layer of the first transaction, and wherein each of the plurality of applications is assigned with a corresponding transaction ID;
based on a determination that an error has occurred during processing of the second transaction, recording an error flag in association with a transaction ID of the second transaction;
identifying the error flag indicated in the second transaction and rolling back the second transaction targeted to the second database;
identifying the first transaction that is in an upper layer of the second transaction associated with the transaction group ID, wherein an error flag has not been recorded in the first transaction; and
rolling back the first transaction targeted to the first database,
wherein the rolling back of the first transaction and the rolling back of the second transaction are performed by a rollback module independently of the first application and the second application, the rollback module being separate from the first application and the second application, and
wherein, when a logic of the rollback module for rolling back data is changed, the logic is changed without interrupting the first application and the second application.

12. The computing device of claim 11, wherein when the second application is called by the first application, the transaction group ID is transmitted to the second application by the first application.

13. The computing device of claim 11, wherein the operation of recording the first transaction comprises receiving, from the first database via a trigger function of the first DBMS, a request for a record of the first transaction, and recording the first transaction in response to the request.

14. The computing device of claim 11, wherein the determination that the error has occurred during processing of the second transaction is based on data recorded in a shared storage.

15. The computing device of claim 11, further comprising deleting recording of the first transaction and recording of the second transaction, in response to a determination that the first transaction and the second transaction have been successfully processed.

16. The computing device of claim 11, wherein the instructions further comprise an instruction for an operation of deleting the recording of the first transaction and the recording of the second transaction, in response to a determination that the first transaction and the second transaction have been successfully rolled back.

17. A computer readable non-transitory recording medium comprising instructions that, when executed by a processor, cause the processor to perform operations comprising:
recording a first transaction requested to a first database by a first application, among a plurality of applications, in association with a transaction group identifier (ID)) wherein the first database has a first database management system (DBMS) mounted thereon;
recording a second transaction requested to a second database distinguished from the first database by a second application called by the first application, among the plurality of applications, in association with the transaction group ID, wherein the second database has a second database management system (DBMS) mounted thereon, the first DBMS and the second DBMS being heterogeneous DBMSs, wherein the plurality of applications are recorded with multiple layers in a sequential order in which the multiple layers are called and processed, a transaction in a highest layer being a firstly processed transaction and a transaction in a lowest layer being a last processed transaction, the second transaction being in a lower layer than a layer of the first transaction, and wherein each of the plurality of applications is assigned with a corresponding transaction ID;

based on a determination that an error has occurred during processing of the second transaction, recording an error flag in association with a transaction ID of the second transaction;

identifying the error flag indicated in the second transaction and rolling back the second transaction targeted to the second database;

identifying the first transaction that is in an upper layer of the second transaction associated with the transaction group ID, wherein an error flag has not been recorded in the first transaction; and rolling back the first transaction targeted to the first database, wherein the rolling back of the first transaction and the rolling back of the second transaction are performed by a rollback module independently of the first application and the second application, the rollback module being separate from the first application and the second application, and wherein, when a logic of the rollback module for rolling back data is changed, the logic is changed without interrupting the first application and the second application.

* * * * *